US 11,509,852 B2

(12) United States Patent
Suzuki et al.

(10) Patent No.: US 11,509,852 B2
(45) Date of Patent: Nov. 22, 2022

(54) IMAGING DEVICE, IMAGING SYSTEM, AND METHOD OF DRIVING IMAGING DEVICE

(71) Applicant: CANON KABUSHIKI KAISHA, Tokyo (JP)

(72) Inventors: Atsushi Suzuki, Kanagawa (JP); Takanori Yamashita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/504,064

(22) Filed: Oct. 18, 2021

(65) Prior Publication Data
US 2022/0132064 A1 Apr. 28, 2022

(30) Foreign Application Priority Data

Oct. 23, 2020 (JP) .............................. JP2020-178130

(51) Int. Cl.
H04N 5/347 (2011.01)
H04N 5/378 (2011.01)
H04N 5/3745 (2011.01)
B60R 11/04 (2006.01)
H04N 13/225 (2018.01)
H04N 13/00 (2018.01)

(52) U.S. Cl.
CPC ......... H04N 5/378 (2013.01); H04N 5/37455 (2013.01); B60R 11/04 (2013.01); H04N 13/225 (2018.05); H04N 2013/0081 (2013.01)

(58) Field of Classification Search
None
See application file for complete search history.

(56) References Cited

U.S. PATENT DOCUMENTS

| 7,903,056 | B2 | 3/2011 | Kawasaki |
| 9,502,451 | B2 | 11/2016 | Yamashita |
| 9,653,498 | B2 | 5/2017 | Yamashita |
| 9,749,570 | B2 | 8/2017 | Yamashita |
| 10,051,223 | B2 | 8/2018 | Yamashita |
| 10,057,529 | B2 | 8/2018 | Saito |
| 10,778,920 | B2 | 9/2020 | Yamashita |
| 11,070,753 | B2 | 7/2021 | Yamashita |

(Continued)

FOREIGN PATENT DOCUMENTS

| JP | 2017-079464 A | 4/2017 |
| JP | 2017-085661 A | 5/2017 |

Primary Examiner — Mark T Monk
(74) Attorney, Agent, or Firm — Venable LLP

(57) ABSTRACT

The imaging device includes a pixel including a photoelectric converter, a first switch, a charge holding portion, and an output unit, an output line, a readout circuit unit connected to the output line, and a control unit. The readout circuit unit includes an amplifier circuit, a second switch between the output line and the amplifier circuit, and a comparator comparing the amplified pixel signal with a reference signal. The control unit performs outputting a pixel signal by transferring the charge in the photoelectric converter to the charge holding portion, determining a level of the pixel signal amplified by the amplifier circuit, and setting a gain of the amplifier circuit in accordance with a result of determination, and sets the second switch to off during the first switch is in on and until the output unit is settled after the first switch transitions from on to off.

15 Claims, 8 Drawing Sheets

(56) References Cited

U.S. PATENT DOCUMENTS

| | | |
|---|---|---|
| 11,082,642 B2 | 8/2021 | Fukuhara |
| 2019/0222787 A1* | 7/2019 | Hirata .................... H04N 5/379 |
| 2019/0379850 A1 | 12/2019 | Shinohara |
| 2020/0374481 A1 | 11/2020 | Yamashita |
| 2021/0250532 A1 | 8/2021 | Akiyama |
| 2021/0377480 A1 | 12/2021 | Yamashita |

* cited by examiner

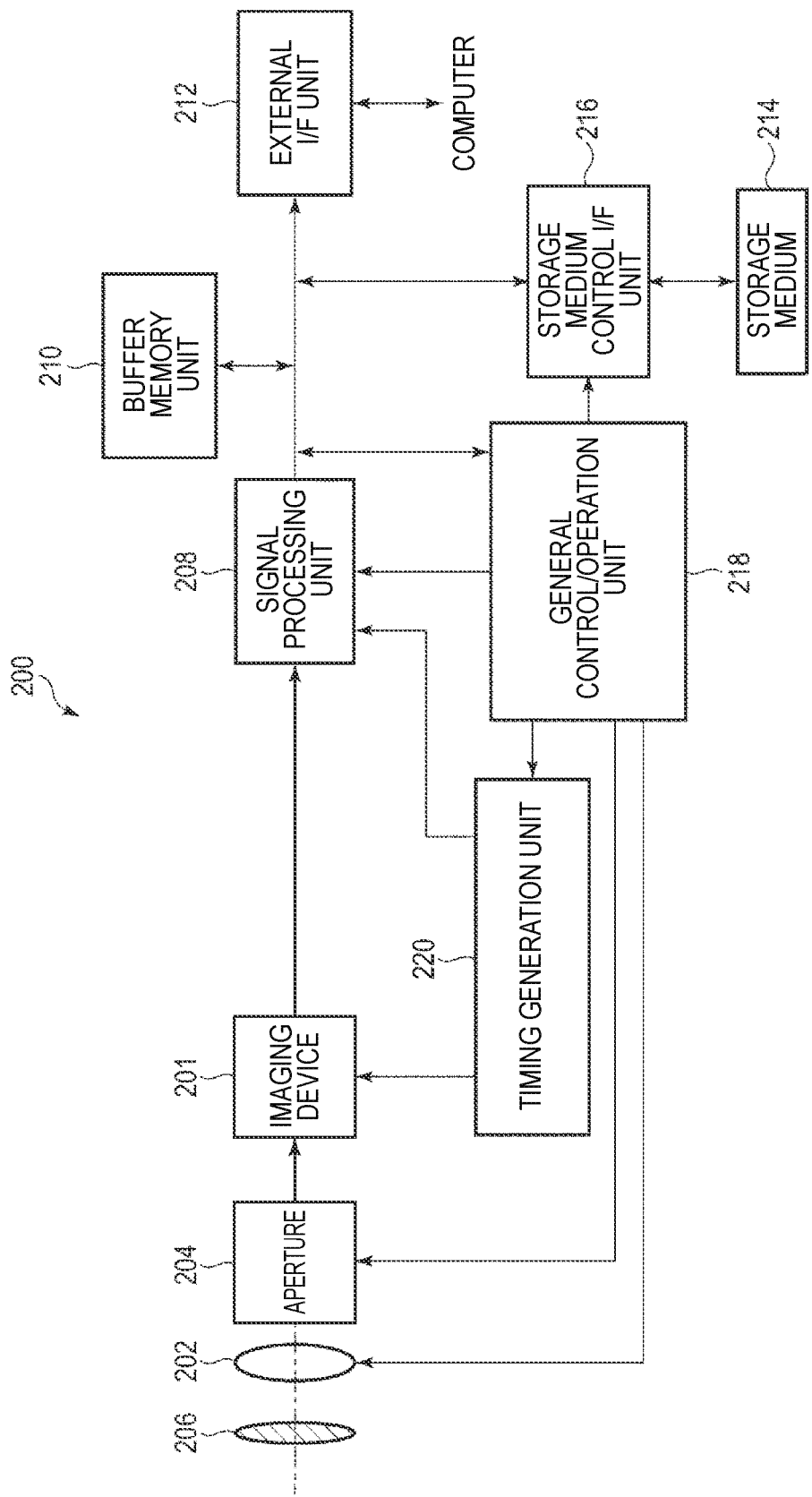

_US 11,509,852 B2_

IMAGING DEVICE, IMAGING SYSTEM, AND METHOD OF DRIVING IMAGING DEVICE

BACKGROUND OF THE INVENTION

Field of the Invention

The present disclosure relates to an imaging device, an imaging system, and a method of driving the imaging device.

Description of the Related Art

As a technique for achieving both a wide dynamic range and high readout speed in an imaging device, a method of switching the gain of an amplifier circuit for each pixel according to an amount of incident light has been proposed. Japanese Patent Application Laid-Open No. 2017-079464 describes a method of correcting a level difference in luminance occurring near a boundary at which a gain of an amplifier circuit is switched.

SUMMARY OF THE INVENTION

An object of the present disclosure is to provide a technique for acquiring a high-quality image without decreasing a readout speed in an imaging device that switches again of an amplifier circuit for each pixel in accordance with an amount of incident light.

According to an aspect of the present disclosure, there is provided an imaging device including a pixel including a photoelectric converter, a charge holding portion, a first switch configured to transfer charge in the photoelectric converter to the charge holding portion, and an output unit configured to output a pixel signal based on an amount of charge held in the charge holding portion, an output line that the pixel signal is to be output from the pixel, a readout circuit unit connected to the output line, and a control unit configured to control the pixel and the readout circuit unit, wherein the readout circuit unit includes an amplifier circuit, a second switch provided between the output line and the amplifier circuit, and a comparator configured to compare the pixel signal amplified by the amplifier circuit with a reference signal, wherein the control unit is configured to perform a first period of outputting a pixel signal based on an amount of charge to the output line by turning on the first switch to transfer the charge in the photoelectric converter to the charge holding portion, a second period of determining by the comparator a level of the pixel signal output to the output line in the first period and amplified by the amplifier circuit, and a third period of setting a gain of the amplifier circuit in accordance with a result of determination by the comparator, and wherein the control unit is further configured to set the second switch to an off state during a period in which the first switch is in an on state and a period until the output unit is settled after the first switch transitions from the on state to an off state.

According to another aspect of the present disclosure, there is provided a method of driving an imaging device including a pixel including a photoelectric converter, a charge holding portion, a first switch configured to transfer charge in the photoelectric converter to the charge holding portion, and an output unit configured to output a pixel signal based on an amount of charge held in the charge holding portion, an output line that the pixel signal is to be output from the pixel, and a readout circuit unit connected to the output line, wherein the readout circuit unit includes an amplifier circuit, a second switch provided between the output line and the amplifier circuit, and a comparator configured to compare the pixel signal amplified by the amplifier circuit with a reference signal, the method including performing a first period of outputting a pixel signal based on an amount of charge to the output line by turning on the first switch to transfer charge in the photoelectric converter to the charge holding portion, performing a second period of determining by the comparator a level of the pixel signal output to the output line in the first period and amplified by the amplifier circuit, and performing a third period of setting a gain of the amplifier circuit according to a result of determination by the comparator, wherein the second switch is set to an off state during a period in which the first switch is in an on state and a period until the output unit is settled after the first switch transitions from the on state to an off state.

Further features of the present invention will become apparent from the following description of exemplary embodiments with reference to the attached drawings.

BRIEF DESCRIPTION OF THE DRAWINGS

FIG. 8 is a block diagram illustrating a schematic configuration of an imaging system according to a second embodiment of the present disclosure.

DESCRIPTION OF THE EMBODIMENTS

Preferred embodiments of the present invention will now be described in detail in accordance with the accompanying drawings.

In Japanese Patent Application Laid-Open No. 2017-079464, by subtracting an offset correction value corresponding to an offset of an amplifier circuit, a level difference in luminance occurring near a boundary at which a gain of the amplifier circuit is switched is reduced. However, since the amplifier circuit has a degree of nonlinearity in the output characteristic with respect to the input signal, the amplifier circuit is influenced by the nonlinearity at the time of acquiring the offset correction value, and a high-quality image cannot be acquired only by subtracting the offset correction value.

The following disclosure corresponds to techniques relating to high quality image acquisition.

First Embodiment

Figure 1:
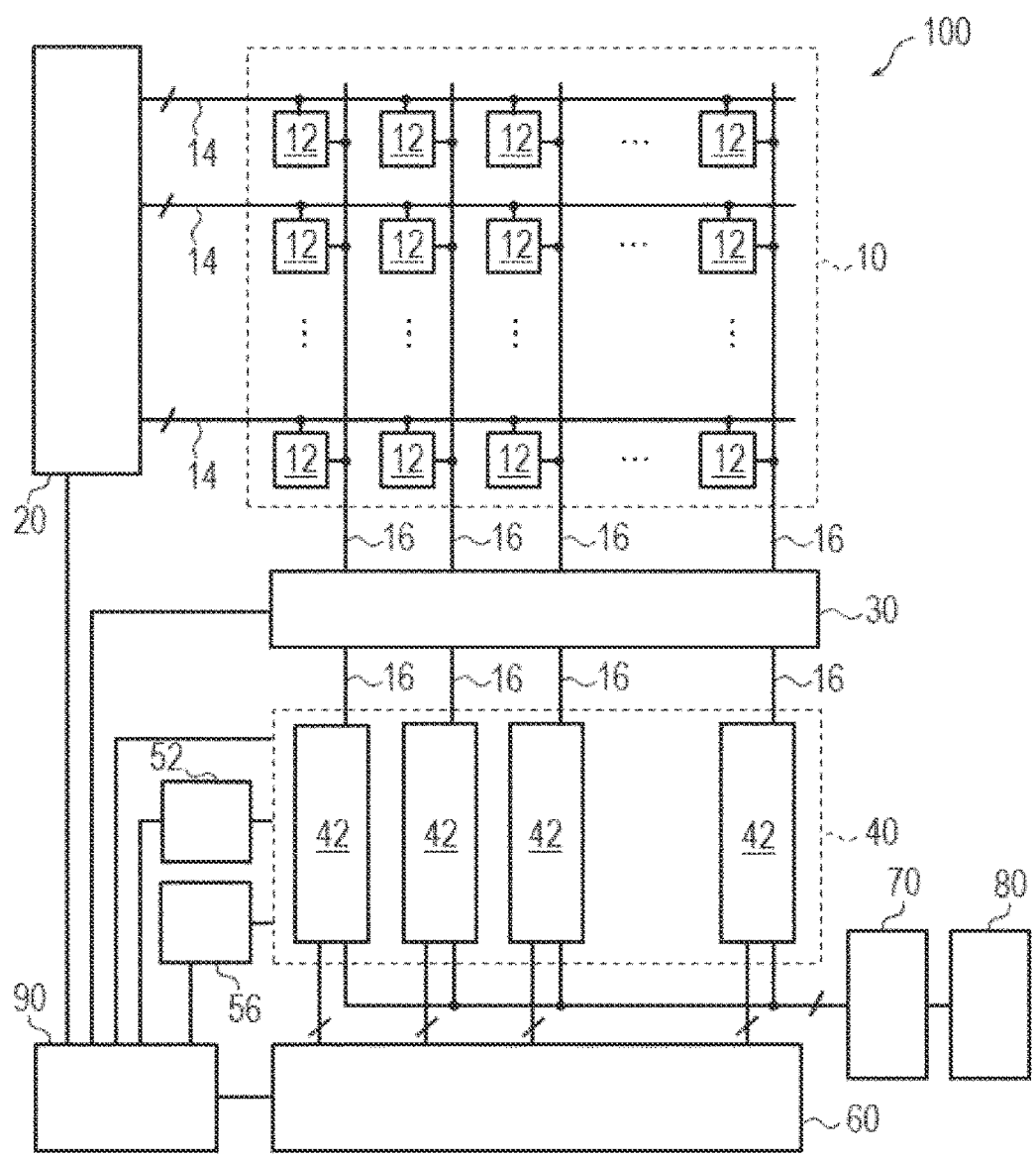
FIG. 1 is a block diagram illustrating a configuration example of an imaging device according to a first embodiment of the present disclosure.
Figure 2:
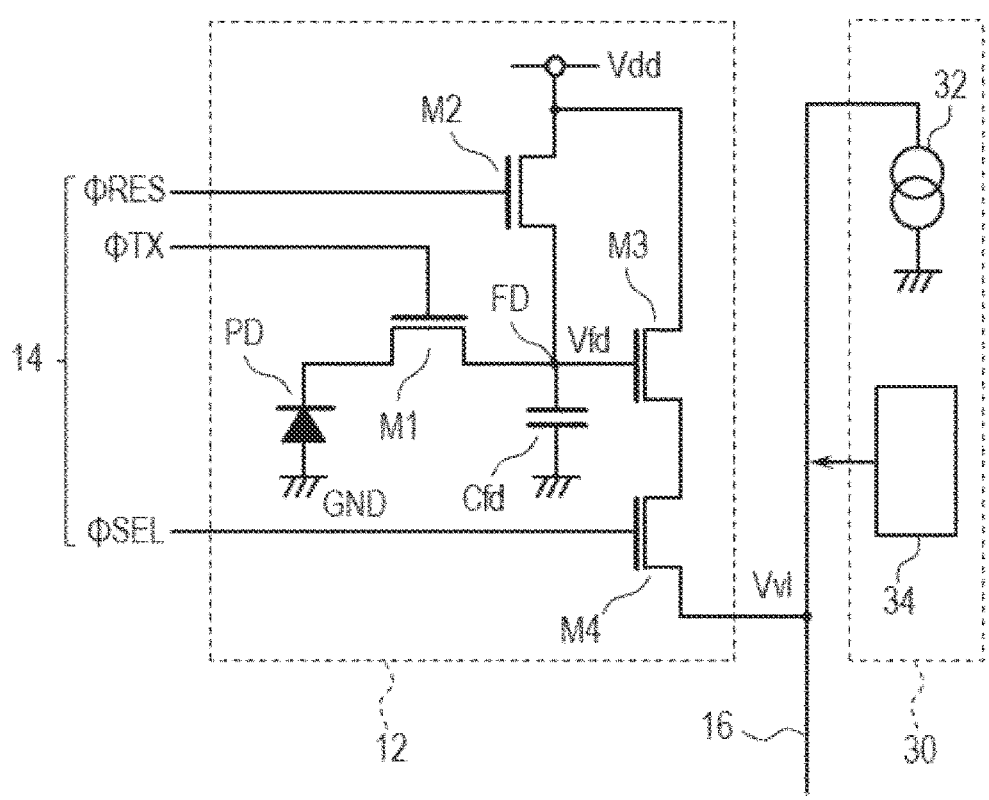
FIG. 2 is a circuit diagram illustrating a configuration example of a pixel and an output line control unit in the imaging device according to the first embodiment of the present disclosure.
Figure 3:
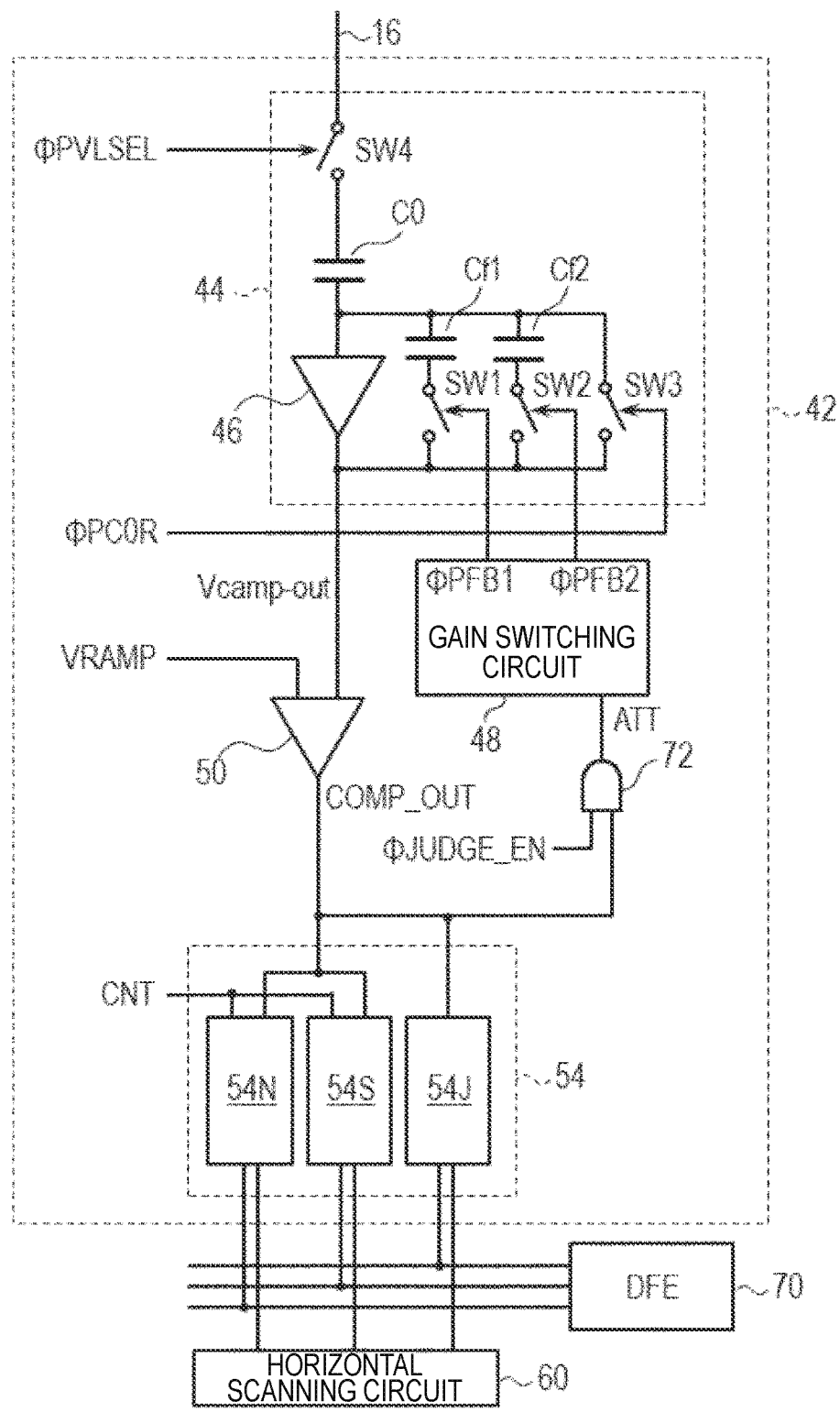
FIG. 3 is a circuit diagram illustrating a configuration example of a column circuit in the imaging device according to the first embodiment of the present disclosure.
Figure 4:
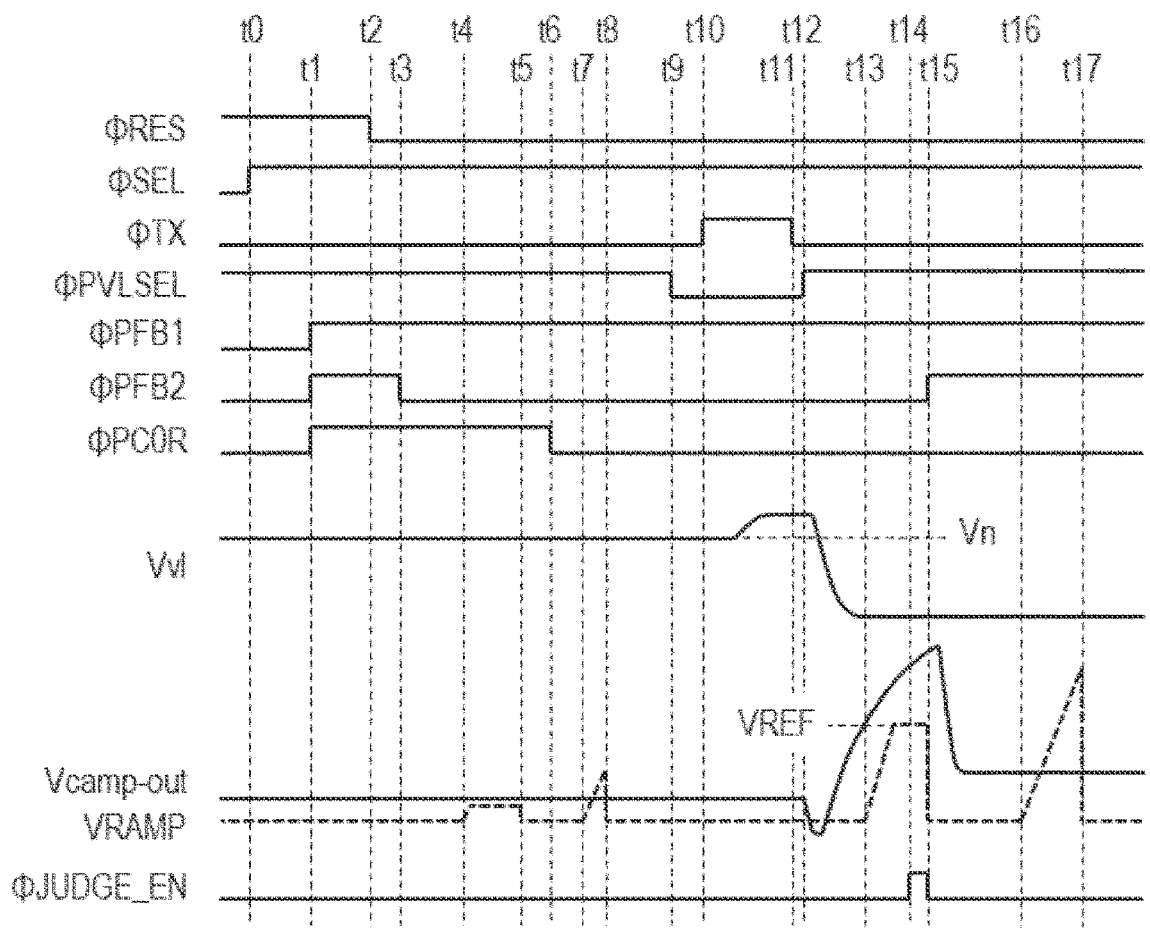
FIG. 4 and FIG. 7 are timing charts illustrating a method of driving the imaging device according to the first embodiment of the present disclosure.
Figure 5A:
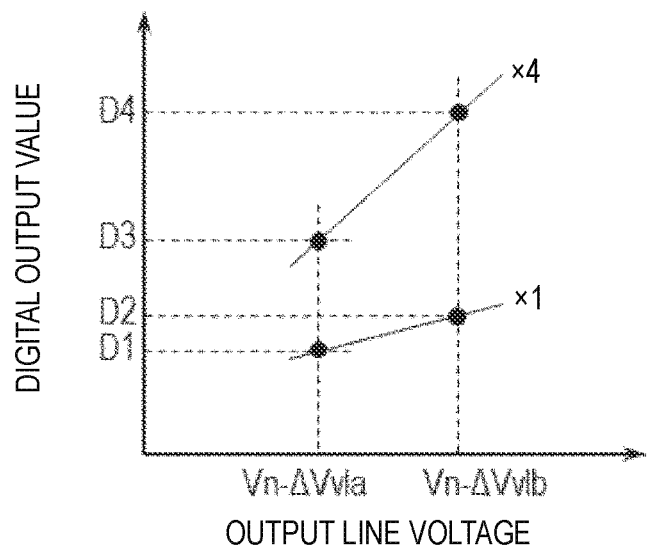
FIG. 5A and FIG. 5B are graphs illustrating a method of correcting a pixel value in the imaging device according to the first embodiment of the present disclosure.
Figure 5B:
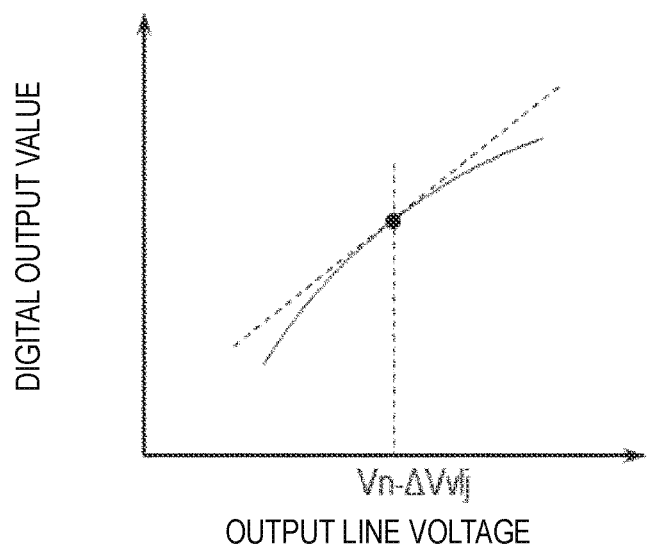
Figure 6:
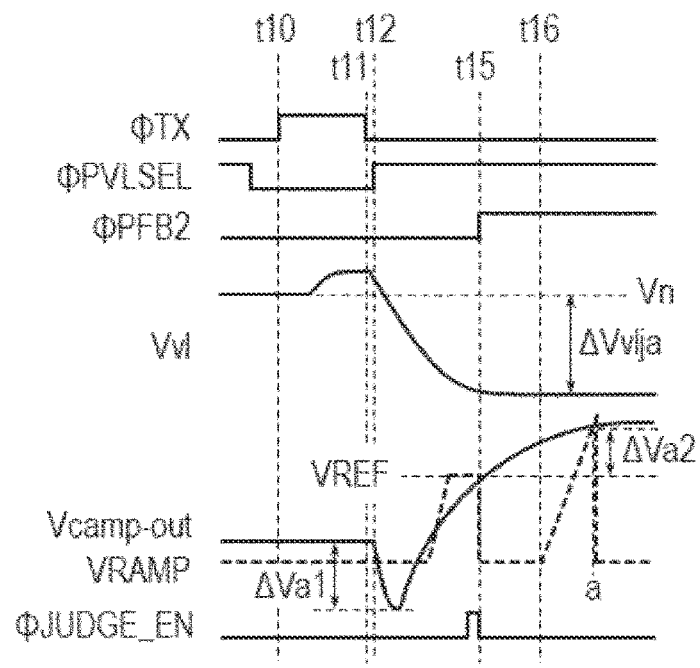
FIG. 6 is a timing chart illustrating a method of driving the imaging device according to the reference example.
Figure 7:
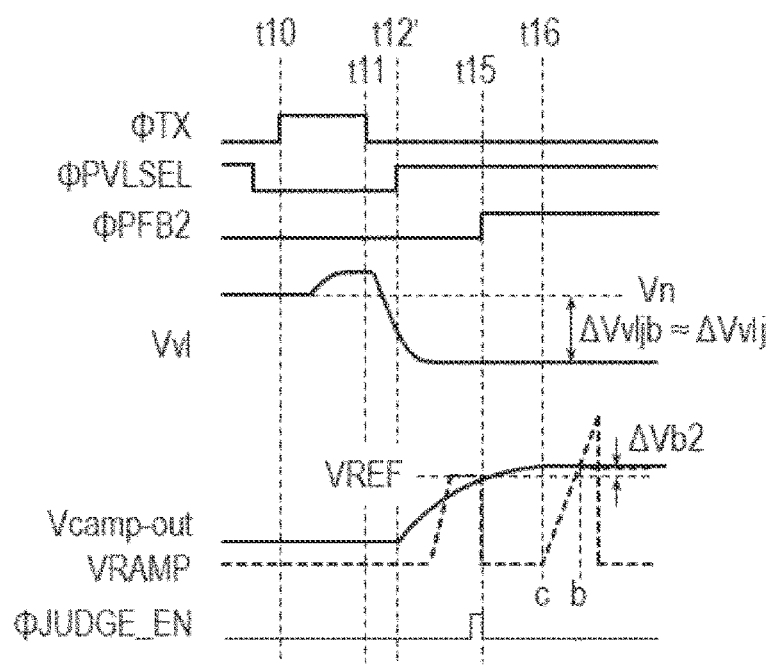

An imaging device and a method of driving the same according to a first embodiment of the present disclosure will be described with reference to FIG. 1 to FIG. 7. FIG. 1 is a block diagram illustrating a configuration example of an imaging device according to the present embodiment. FIG. 2 is a circuit diagram illustrating a configuration example of a pixel and an output line control unit in the imaging device according to the present embodiment. FIG. 3 is a circuit diagram illustrating a configuration example of a column circuit in the imaging device according to the present embodiment. FIG. 4 and FIG. 7 are timing charts illustrating a method of driving the imaging device according to the present embodiment. FIG. 5A and FIG. 5B are graphs illustrating a method of correcting a pixel value in the imaging device according to the present embodiment. FIG. 6 is a timing chart illustrating a method of driving the imaging device according to the reference example.

First, a general configuration of the imaging device according to the present embodiment will be described with reference to FIG. 1.

As illustrated in FIG. 1, the imaging device 100 according to the present embodiment includes a pixel array unit 10, a vertical scanning circuit 20, an output line control unit 30, a readout circuit unit 40, a reference signal generation unit 52, and a counter 56. The imaging device 100 further includes a horizontal scanning circuit 60, a signal processing unit 70, a signal output unit 80, and a control unit 90.

The pixel array unit 10 is provided with a plurality of pixels 12 arranged in matrix over a plurality of rows and a plurality of columns. FIG. 1 illustrates a part of the plurality of pixels 12 constituting the pixel array unit 10 for convenience. The number of pixels 12 constituting the pixel array unit 10 is not particularly limited. A specific configuration example of the pixel 12 will be described later.

In each row of the pixel array unit 10, a control line 14 is arranged so as to extend in a first direction (a lateral direction in FIG. 1). Each of the control lines 14 is connected to each of the pixels 12 arranged in the first direction, and forms a signal line common to these pixels 12. The first direction in which the control lines 14 extend may be referred to as a row direction or a horizontal direction. The control lines 14 are connected to the vertical scanning circuit 20.

In each column of the pixel array unit 10, an output line 16 is arranged so as to extend in a second direction (vertical direction in FIG. 1) intersecting the first direction. Each of the output lines 16 is connected to each of the pixels 12 arranged in the second direction, and forms a signal line common to these pixels 12. The second direction in which the output lines 16 extend may be referred to as a column direction or a vertical direction. Each of the output lines 16 is connected to an output line control unit 30 and a readout circuit unit 40.

The vertical scanning circuit 20 is a control circuit that supplies to the pixels 12 a control signal for driving the pixels 12 on a row-by-row basis via a control line 14 provided in each row of the pixel array unit 10. The vertical scanning circuit 20 may be configured using a shift register or an address decoder.

The output line control unit 30 is a control circuit unit that controls a bias current supplied to each of the output lines 16 and a voltage of each of the output lines 16.

The readout circuit unit 40 includes a plurality of column circuits 42 provided corresponding to the output lines 16 of each column. Each of the column circuits 42 is connected to the output line 16 of a corresponding column. Each of the column circuits 42 has a function of performing amplification processing and AD (analog-digital) conversion processing on the analog signal output from the pixel 12 of the corresponding column and holding the processed digital signal. A specific configuration example of the column circuit 42 will be described later.

The reference signal generation unit 52 is connected to the readout circuit unit 40. The reference signal generation unit 52 has a function of generating a reference signal for luminance determination and a reference signal for use in AD conversion, and supplying the reference signal to the readout circuit unit 40. The reference signal used for AD conversion may have a predetermined amplitude according to the range of the pixel signal, and the signal level may change with lapse of time. The reference signal is not particularly limited, but may be, for example, a ramp signal in which the signal level monotonically increases or monotonically decreases with lapse of time. The change in the signal level does not necessarily have to be continuous, and may be stepwise. The change in the signal level is not necessarily linear with respect to time, and may be curved with respect to time (e.g., sine wave or cosine wave).

The counter 56 is connected to the readout circuit unit 40. The counter 56 starts a counting operation in synchronization with a timing at which a change in the signal level of the reference signal supplied from the reference signal generation unit 52 starts, and outputs a count signal indicating the count value to the readout circuit unit 40.

The horizontal scanning circuit 60 is connected to the readout circuit unit 40. The horizontal scanning circuit 60 has a function of sequentially supplying to the column circuits 42 of the respective columns control signals for outputting digital signals stored in the column circuits 42 of the respective columns. The control lines of the horizontal scanning circuit 60 provided corresponding to the respective columns of the pixel array unit 10 are connected to the column circuits 42 of the corresponding columns. When the column circuit 42 of each column receives the control signal via the control line of the corresponding column of the horizontal scanning circuit 60, the column circuit 42 outputs the digital pixel signal held therein to the signal processing unit 70. The horizontal scanning circuit 60 has a function as a transfer unit that sequentially transfers the signals held in the column circuits 42 to a subsequent processing unit (signal processing unit 70) on a column-by-column basis.

The signal processing unit (DFE: Digital Front End) 70 is a circuit unit that performs predetermined signal processing on the digital signal output from the readout circuit unit 40. Examples of the processing executed by the signal processing unit 70 include amplification processing and digital correlation double sampling (CDS) processing. The digital CDS processing is a signal processing for performing a subtraction process of (S–N) on the noise signal N and the light signal S stored in the memory unit as digital pixel signals.

The signal output unit 80 is a circuit unit that outputs the signal processed by the signal processing unit 70 to the outside of the imaging device 100. The signal output unit 80 includes an external interface such as LVDS (Low Voltage Differential Signaling), and outputs the digital signal after signal processing to the outside of the imaging device 100.

The control unit 90 is a circuit unit that supplies control signals for controlling operations and timings of the vertical scanning circuit 20, the output line control unit 30, the readout circuit unit 40, the reference signal generation unit 52, the counter 56, and the horizontal scanning circuit 60. All of these control signals need not be supplied from the control unit 90, and at least a part of these control signals may be supplied from the outside of the imaging device 100.

Next, a configuration example of the pixel 12 and the output line control unit 30 in the imaging device 100 according to the present embodiment will be described with reference to FIG. 2.

Each of the pixels 12 may be the smallest unit of circuitry that is repeatedly arranged to construct an image. As illustrated in FIG. 2, each of the pixels 12 may include a photoelectric converter PD, a transfer transistor M1, a reset transistor M2, an amplifier transistor M3, and a select transistor M4. The transfer transistor M1, the reset transistor M2, the amplifier transistor M3, and the select transistor M4 may be n-channel MOS transistors, for example, but may be p-channel MOS transistors or other known switch elements.

The photoelectric converter PD may be, for example, a photodiode. The photodiode constituting the photoelectric converter PD has an anode connected to the ground node and a cathode connected to the source of the transfer transistor M1. The drain of the transfer transistor M1 is connected to the source of the reset transistor M2 and the gate of the amplifier transistor M3. A connection node of the drain of the transfer transistor M1, the source of the reset transistor M2, and the gate of the amplifier transistor M3 is a so-called floating diffusion FD. The floating diffusion FD includes a capacitance component (floating diffusion capacitor Cfd) and functions as a charge holding portion. The floating diffusion capacitor Cfd may include a p-n junction capacitor, an interconnection capacitor, and the like.

The drain of the reset transistor M2 and the drain of the amplifier transistor M3 are connected to a power supply node (voltage Vdd). The source of the amplifier transistor M3 is connected to the drain of the select transistor M4. The source of the select transistor M4 is connected to the output line 16.

In the case of the pixel configuration of FIG. 2, the control line 14 of each row arranged in the pixel array unit 10 includes three signal lines to which the control signals φRES, φTX, and φSEL from the vertical scanning circuit 20 are supplied. The signal line to which the control signal φRES is supplied is connected to the gates of the reset transistors M2 of the pixels 12 belonging to the corresponding row, and forms a common signal line for these pixels 12. The signal line to which the control signal φTX is supplied is connected to the gates of the transfer transistors M1 of the pixels 12 belonging to the corresponding row, and forms a common signal line for these pixels 12. The signal line to which the control signal φSEL is supplied is connected to the gates of the select transistors M4 of the pixels 12 belonging to the corresponding row, and forms a common signal line for these pixels 12. In a case that each transistor constituting the pixel 12 is formed of an n-channel transistor, when a control signal of High level (hereinafter referred to as "H level") is supplied from the vertical scanning circuit 20, the corresponding transistor is turned on (conductive state). When a control signal of Low level (hereinafter referred to as "L level") is supplied from the vertical scanning circuit 20, the corresponding transistor is turned off (non-conductive state).

The output line control unit 30 includes a current source 32 and a voltage supply circuit 34 corresponding to the output line 16 in each column. The current source 32 has a function of supplying a bias current to the pixel 12 via the output line 16. The voltage supply circuit 34 has a function of supplying a predetermined constant voltage to the output line 16 when acquiring a correction value for correcting the pixel signal. A method of correcting the pixel signal and acquiring the correction value will be described later.

The photoelectric converter PD converts (photoelectrically converts) the incident light into an amount of charge corresponding to the amount of light, and accumulates the generated charge. The transfer transistor M1 has a function as a transfer unit that transfers charge held by the photoelectric converter PD to the floating diffusion FD when the transfer transistor M1 is turned on. In this specification, the transfer transistor M1 may be referred to as a switch. The floating diffusion FD functions as a charge holding portion that holds charge transferred from the photoelectric converter PD, and becomes a voltage Vfd corresponding to the amount of charge transferred from the photoelectric converter PD by charge-voltage conversion by the floating diffusion capacitor Cfd. The amplifier transistor M3 has a configuration in which a power supply voltage is supplied to the drain thereof and a bias current is supplied to the source thereof from the current source 32 via the output line 16 and the select transistor M4, and constitutes an amplifier unit (source follower circuit) having the gate as an input node. The select transistor M4 is a switch for selecting the pixel 12, and is turned on to connect the amplifier transistor M3 to the output line 16. Thus, the amplifier transistor M3 outputs a signal corresponding to the voltage Vfd of the floating diffusion FD to the output line 16 via the select transistor M4. The amplifier transistor M3 and the select transistor M4 function as an output unit that outputs a pixel signal corresponding to the amount of charge held in the floating diffusion FD. When the reset transistor M2 is turned on, the floating diffusion FD is reset to a voltage corresponding to the power supply voltage.

As described above, the transfer transistor M1, the reset transistor M2, and the select transistor M4 of the pixel 12 are controlled in row units by the control signals φTX, φRES, and φSEL supplied from the vertical scanning circuit 20. The pixel signals of the pixels 12 belonging to the row selected by the control signal φSEL are simultaneously output to the corresponding output lines 16 of the respective pixels 12. The pixel signal output from each of the pixels 12 is an analog signal.

Next, a configuration example of the column circuit 42 in the imaging device 100 according to the present embodiment will be described with reference to FIG. 3.

Each of the column circuits 42 may include, for example, as illustrated in FIG. 3, an amplifier circuit 44, a gain switching circuit 48, a comparator 50, a column memory 54, and a logic gate 72.

The amplifier circuit 44 may include an amplifier 46, capacitors C0, Cf1, and Cf2, and switches SW1, SW2, SW3, and SW4. The amplifier 46 has at least one input node and at least one output node. The amplifier 46 may be a common source amplifier circuit or a differential input amplifier circuit. In the present embodiment, the amplifier circuit 44 constitutes an inverting amplifier circuit. The capacitor C0 is an input capacitor of the amplifier 46. The capacitors Cf1 and Cf2 are feedback capacitors of the amplifier 46. In this specification, similar reference numerals may be used to denote capacitance values of these capacitors.

One node of the switch SW4, which is also the input node of the amplifier circuit 44, is connected to the output line 16 of the corresponding column. The other node of the switch SW4 is connected to one electrode of the capacitor C0. The other electrode of the capacitor C0, one electrode of the capacitor Cf1, one electrode of the capacitor Cf2, and one node of the switch SW3 are connected to the input node of the amplifier 46. One node of the switch SW1 is connected to the other electrode of the capacitor Cf1. One node of the switch SW2 is connected to the other electrode of the capacitor Cf2. The other node of the switch SW1, the other node of the switch SW2, and the other node of the switch SW3 are connected to an output node of the amplifier 46 which is also an output node of the amplifier circuit 44.

The connection state of the switch SW1 is controlled by a control signal φPFB1 supplied from the gain switching circuit 48. The connection state of the switch SW2 is controlled by a control signal φPFB2 supplied from the gain switching circuit 48. The connection state of the switch SW3 is controlled by a control signal φPC0R supplied from the control unit 90. The connection state of the switch SW4 is controlled by a control signal φPVLSEL supplied from the control unit 90. In the present embodiment, it is assumed that the switches SW1, SW2, SW3, and SW4 are turned on (conductive state) when the corresponding control signal is at the H level, and turned off (nonconductive state) when the corresponding control signal is at the L level. However, the relationship between the level of the control signal and the state of the switch may be reversed.

The comparator 50 has two input nodes and one output node. One input node of the comparator 50 is connected to the output node of the amplifier circuit 44. The other input node of the comparator 50 is supplied with the reference signal VRAMP from the reference signal generation unit 52. The comparator 50 may function as a part of a determination circuit that determines the luminance of the pixel signal output from the amplifier circuit 44. The comparator 50 may function as a part of an analog-to-digital conversion circuit that performs an analog-to-digital conversion on the pixel signal output from the amplifier circuit 44.

The column memory 54 may include an N-memory 54N, an S-memory 54S, and a J-memory 54J. Each of the N-memory 54N and the S-memory 54S has three input nodes and one output node. The J-memory 54J has two input nodes and one output node.

The first input node of the N-memory 54N, the first input node of the S-memory 54S, and the first input node of the J-memory 54J are connected to the output node of the comparator 50. The second input node of the N-memory 54N, the second input node of the S-memory 54S, and the second input node of the J-memory 54J are connected to the horizontal scanning circuit 60. The counter 56 supplies the count signal CNT to the third input node of the N-memory 54N and the third input node of the S-memory 54S. The output node of the N-memory 54N, the output node of the S-memory 54S, and the output node of the J-memory 54J are connected to the signal processing unit 70. The count signal CNT and the pixel signals output from the N-memory 54N and the S-memory 54S are digital signals, and signal lines for transmitting these signals are constituted by a plurality of signal lines corresponding to the number of bits.

The logic gate 72 may be a logic circuit, e.g., a two-input AND gate, having two input nodes and one output node. One input node of the logic gate 72 is connected to the output node of the comparator 50. A control signal φJUDGE_EN is supplied from the control unit 90 to the other input node of the logic gate 72.

The gain switching circuit 48 has one input node and two output nodes. The input node of the gain switching circuit 48 is connected to the output node of the logic gate 72. One output node of the gain switching circuit 48 outputs a control signal φPFB1 to be supplied to the switch SW1. The other output node of the gain switching circuit 48 outputs a control signal φPFB2 to be supplied to the switch SW2.

The amplifier circuit 44 has a function of amplifying and outputting the analog pixel signal supplied from the output line 16. The input portion of the amplifier circuit 44 is provided with the switch SW4, and connection and disconnection between the output line 16 and the amplifier circuit 44 may be controlled in accordance with the control signal φPVLSEL.

When the switch SW1 is turned on, the input node and the output node of the amplifier 46 are connected via the capacitor Cf1. When the switch SW2 is turned on, the input node and the output node of the amplifier 46 are connected via the capacitor Cf2. That is, the capacitors Cf1 and Cf2 are feedback capacitors of the amplifier 46. As described above, the switches SW1 and SW2 are controlled by the control signals φPFB1 and φPFB2 supplied from the gain switching circuit 48. When the switch SW3 is turned on, the input node and the output node of the amplifier 46 are short-circuited, and the amplifier 46 and the capacitors C0, Cf1, and Cf2 are reset. As described above, the switch SW3 is controlled by the control signal φPC0R supplied from the control unit 90.

The gain of the amplifier circuit 44 is expressed by a ratio (CIN/CF) between the input capacitance CIN and the feedback capacitance CF. Here, the feedback capacitance CF becomes (Cf1+Cf2) when both the switches SW1 and SW2 are on, becomes Cf1 when the switch SW1 is on and the switch SW2 is off, and becomes Cf2 when the switch SW1 is off and the switch SW2 is on. That is, active feedback capacitors (capacitors Cf1 and Cf2) may be selected by controlling the switches SW1 and SW2 by the control signals φPFB1 and φPFB2. The input capacitance CIN corresponds to the capacitance of the capacitor C0.

The capacitance values of the capacitors C0, Cf1, and Cf2 may be suitably set in accordance with the gain required for the amplifier circuit 44. In the present embodiment, the capacitance value of the capacitor C0 is 4C, the capacitance value of the capacitor Cf1 is C, and the capacitance value of the capacitor Cf2 is 3C (C is an arbitrary constant). In this case, the gain of the amplifier circuit 44 becomes one time (C0/(Cf1+Cf2)=4C/(C+3C)=1) when both the switches SW1 and SW2 are on. The gain of the amplifier circuit 44 is four times (C0/(Cf1+Cf2)=4C/(C+0)=4) when the switch SW1 is on and the switch SW2 is off.

The comparator 50 compares the level of the signal Vcamp-out output from the amplifier circuit 44 with the level of the reference signal VRAMP, and outputs a signal COMP_OUT corresponding to the comparison result. For example, the comparator 50 outputs the H level signal COMP_OUT when the level of the reference signal VRAMP is lower than the level of the signal Vcamp-out. When the level of the reference signal VRAMP is higher than the level of the signal Vcamp-out, the comparator 50 outputs the signal COMP_OUT of the L level. The relationship between the magnitude of the input signal and the level of the output signal may be reversed.

The logic gate 72 receives the signal COMP_OUT and the control signal φJUDGE_EN supplied from the control unit 90, and outputs a control signal ATT. The control signal φJUDGE_EN is a determination permission signal for permitting determination processing for determining whether the analog pixel signal has a low luminance or a high luminance. The logic gate 72 outputs the control signal ATT of the H level when the signal COMP_OUT and the control signal φJUDGE_EN are at the H level, and outputs a control signal ATT of the L level otherwise.

The gain switching circuit 48 outputs the control signals φPFB1 and φPFB2 according to a control signal from the control unit 90. The gain switching circuit 48 may also output the control signals φPFB1 and φPFB2 corresponding to the level of the control signal ATT In the present embodiment, the control signals φPFB1 and φPFB2 of the H level are output when the control signal ATT is at the H level, and the control signals φPFB1 and φPFB2 of the L level are output when the control signal ATT is at the L level.

The column memory 54 includes an N-memory 54N for storing a signal level of a reset state of the amplifier circuit 44, an S-memory 54S for storing a signal level corresponding to incident light, and a J-memory for storing gain switching determination information, which will be described later. In the N-memory 54N and the S-memory 54S, the count value indicated by the count signal CNT output from the counter 56 at the timing when the level of the signal COMP_OUT is inverted is held as digital data (digital pixel signal) of the analog pixel signal. The J-memory 54J holds a signal corresponding to the level of the signal COMP_OUT as gain switching determination information. The digital data stored in the N-memory 54N, the S-memory 54S, and the J-memory 54J are sequentially transferred to the signal processing unit 70 for each column in response to a control signal supplied from the horizontal scanning circuit 60.

When the pixel signal is read out from the pixel array unit 10, first, the control signal φPC0R is controlled to the H level to turn on the switch SW3, and the initial reset of the amplifier circuit 44 is performed. Next, the control signal φPFB1 is controlled to the H level, the control signals φPFB2 and φPC0R are controlled to the L level to turn on the switch SW1 and to turn off the switches SW2 and SW3. In this state, a pixel signal (N-level signal) corresponding to the pixel signal reference voltage is output to the output line 16. As a result, the N-level signal is amplified at a gain of four times, and is output from the amplifier circuit 44.

Next, when a signal (S-level signal) corresponding to the amount of incident light is output from the pixel 12, the comparator 50 compares the pixel signal amplified by the amplifier circuit 44 with the reference signal VRAMP, and outputs a signal COMP_OUT as a determination latch signal between low luminance and high luminance. The logic gate 72 supplies a control signal ATT corresponding to the level of the signal COMP_OUT to the gain switching circuit 48.

As a result of comparison by the comparator 50, when it is determined that the pixel signal has a high luminance, the control signal φPFB2 is controlled to the H level by the gain switching circuit 48, and the switch SW2 is turned on, whereby the gain of the amplifier circuit 44 is switched from four times to one time. On the other hand, as a result of comparison by the comparator 50, when it is determined that the pixel signal has a low luminance, the control signal φPFB2 remains at the L level, the switch SW2 remains off, and the gain of the amplifier circuit 44 remains four times.

By driving the column circuit 42 in this manner, the gain of the amplifier circuit 44 at the time of reading out the S-level signal may be set to four times at the time of low luminance and to one time at the time of high luminance, and it is possible to achieve both high-speed readout and dynamic range without deteriorating the S/N characteristic.

Next, a method of driving the imaging device according to the present embodiment will be described more specifically with reference to FIG. 4 to FIG. 7.

FIG. 4 is a timing chart illustrating a pixel signal readout operation in an arbitrary row of the pixel array unit 10. FIG. 4 illustrates the levels of the control signals φRES, φSEL, φTX, φPVLSEL, φPFB1, φPFB2, φPC0R, φJUDGE_EN, the voltage Vvl of the output line 16, the signal Vcamp-out, and the reference signal VRAMP.

The time t0 is a timing at which a readout operation is started in an arbitrary row of the pixel array unit 10. In a period prior to the time t0, it is assumed that the control signal φRES and the control signal φPVLSEL of the corresponding row are at the H level, and the other control signals φSEL, φTX, φPFB1, φPFB2, φPC0R, and φJUDGE_EN are at the L level.

At time t0, the vertical scanning circuit 20 controls the control signal φSEL of the row to be read out from the L level to the H level. Thus, the select transistors M4 of the pixels 12 belonging to the row are turned on, and the pixels 12 may output pixel signals to the output lines 16 of the corresponding columns.

At a subsequent time t1, the control unit 90 controls the control signal φPC0R from the L level to the H level. The gain switching circuit 48 controls the control signals φPFB1 and φPFB2 from the L level to the H level. Thereby, the switches SW1, SW2, and SW3 of the amplifier circuit 44 are turned on, and the capacitors C0, Cf1, and Cf2 are reset.

At a subsequent time t2, the vertical scanning circuit 20 controls the control signal φRES of the row to be read out from the H level to the L level. Thereby, the reset transistors M2 of the pixels 12 belonging to the row are turned off, and the reset states of the floating diffusions FD of the pixels 12 are released. Thus, the floating diffusion FD (floating diffusion capacitor Cfd) holds the pixel signal reference voltage including the noise component caused by the reset operation of the pixel 12. A pixel signal (N-level signal) corresponding to the pixel signal reference voltage of the floating diffusion FD is output to the output line 16.

At a subsequent time t3, the gain switching circuit 48 controls the control signal φPFB2 from the H level to the L level. Thereby, the switch SW2 of the amplifier circuit 44 is turned off, and the reset state of the capacitor Cf2 is released. Since the potential of the capacitor Cf2 on the switch SW2 side becomes unstable when the switch SW2 is turned off, the capacitor Cf2 is reset in a period until time t3 for each read row so that the potential decreases during the read operation and the switch SW2 is erroneously turned on and the gain is not changed.

The subsequent period from time t4 to time t5 is the reset period of the comparator 50. Between time t4 and time t5, the reference signal generation unit 52 increases the reference signal VRAMP to the level of the offset voltage of the comparator 50 and resets the comparator 50. Thus, the voltage level obtained by decreasing the reset level of the comparator 50 by the offset voltage may be set as the initial state of the input node of the reference signal VRAMP. Since the linearity of the reference signal VRAMP at the time of rising is poor, the AD conversion process may be avoided from being performed at a position where the linearity of the reference signal VRAMP is poor by setting the offset, and the AD conversion accuracy may be improved.

At a subsequent time t6, the control unit 90 controls the control signal φPC0R from the H level to the L level. Thereby, the switch SW3 of the amplifier circuit 44 is turned off, and the reset state of the amplifier circuit 44 is released.

At the same time, charges corresponding to the pixel signal reference voltage at the time of reset are held in the capacitor C0.

The subsequent period from time t7 to time t8 is a period during which AD conversion is performed on the pixel signal of the N-level corresponding to the pixel signal reference voltage. The reference signal generation unit 52 starts increasing the signal level of the reference signal VRAMP from time t7. The comparator 50 compares the level of the signal Vcamp-out with the level of the reference signal VRAMP, and inverts the signal COMP_OUT from the H level to the L level when the level of the reference signal VRAMP exceeds the level of the signal Vcamp-out. A count signal CNT from which counting is started in synchronization with the start of the increase of the reference signal VRAMP at time t7 is input to the column memory 54 from the counter 56. The N-memory 54N stores the count value indicated by the count signal CNT at the timing when the signal COMP_OUT is inverted as a digital value obtained by AD conversion of the pixel signal of the N-level.

During the period from the subsequent time t9 to the time t12, the control unit 90 controls the control signal ϕPVLSEL from the H level to the L level to turn off the switch SW4 of the amplifier circuit 44. Thus, the amplifier circuit 44 is disconnected from the output line 16, and noise generated by driving the pixel circuit when the pixel signal is read out is prevented from inputting to the amplifier circuit 44, thereby reducing variation in the output of the amplifier circuit 44.

During the period from the time t10 to the time t11 between the time t9 and the time t12, the vertical scanning circuit 20 controls the control signal ϕTX of the pixels 12 of the row to be read out from the L level to the H level. Thus, the transfer transistors M1 of the pixels 12 belonging to the row are turned on, and the charges accumulated in the photoelectric converters PD during the predetermined exposure period are transferred to the floating diffusions FD. The floating diffusion FD has a voltage corresponding to the amount of charge transferred from the photoelectric converter PD, and a pixel signal (S-level signal) corresponding to the voltage of the floating diffusion FD is output to the output line 16.

At time t12, the control signal $PVLSEL becomes the H level and the switch SW4 is turned on, whereby the amplifier circuit 44 is connected to the output line 16, and the amplifying operation of the pixel signal (S-level signal) in the amplifier circuit 44 is started.

The subsequent period from time t13 to time t15 is a determination period of the level of the pixel signal in the comparator 50, specifically, a luminance determination period for determining whether the pixel signal is a low luminance signal or a high luminance signal. The reference signal generation unit 52 starts increasing the signal level of the reference signal VRAMP at time t13, and maintains it until time t15 after the signal level reaches a predetermined reference voltage VREF. The reference voltage VREF is a threshold voltage serving as a reference for determining whether the pixel signal is a low-luminance signal or a high-luminance signal. During a period from time t14 to time t15 after the signal level of the reference signal VRAMP reaches the reference voltage VREF, the control unit 90 controls the control signal ϕJUDGE_EN from the L level to the H level. As a result, the comparator 50 may perform the determination process.

In the period from time t14 to time t5, when the level of the signal Vcamp-out exceeds the level of the reference voltage VREF, the level of the signal COMP_OUT output from the comparator 50 becomes the H level. In the J-memory 54J, "1" is stored as information representing high luminance (J=1). On the other hand, in the period from time t14 to time t15, when the level of the signal Vcamp-out is equal to or lower than the level of the reference voltage VREF, the level of the signal COMP_OUT output from the comparator 50 is maintained at the L level. In the J-memory 54J, "0" is stored as information representing low luminance (J=0). That is, the signal COMP_OUT output from the comparator 50 is used as a discrimination latch pulse, and the corresponding information is stored in the J-memory 54J.

The discrimination latch pulse (signal COMP_OUT) is also input to the logic gate 72 together with the control signal ϕJUDGE_EN. In the period from time t14 to time t15, when the signal COMP_OUT is at the H level, the control signal ATT which is the output signal of the logic gate 72 is at the H level. Accordingly, the control signal PFB2 becomes the H level, the switch SW2 is turned on, and the gain of the amplifier circuit 44 is switched from four times to one time. As a result, the level of the signal Vcamp-out decreases to V4. On the other hand, in the period from time t14 to time t15, when the signal COMP_OUT is at the L level, the control signal ATT, which is the output signal of the logic gate 72, is at the L level. As a result, the control signal PFB2 remains at the L level, the switch SW2 remains off, and the gain of the amplifier circuit 44 remains four times.

In order to improve the correction accuracy described later, it is desirable that the signal Vcamp-out is settled during a period from the start of the amplifying operation of the amplifier circuit 44 to the end of the luminance determination, and whether the luminance is low or high may be determined as assumed. Note that "settling" of a signal does not refer to a case where the potential does not change completely, but may be regarded as "settling" even if a transient response occurs if the amount of change in potential per unit time is less than a predetermined value. The predetermined value is a value 10% of the maximum value of the potential change amount per unit time of the signal. A value of 5% is preferable. In order to maintain the high-speed operation of the imaging device, it is difficult to delay the time t15, and actually, the timing of the time t15 may be set during the transient response period of the output of the amplifier circuit 44. This case is also included in the range of "settling".

The subsequent period from time t16 to time t17 is a period during which AD conversion is performed on the pixel signal of the S-level. The reference signal generation unit 52 starts increasing the signal level of the reference signal VRAMP from time t16. The comparator 50 compares the level of the signal Vcamp-out with the level of the reference signal VRAMP, and inverts the signal COMP_OUT from the H level to the L level when the level of the reference signal VRAMP exceeds the level of the signal Vcamp-out. A count signal CNT from which counting is started in synchronization with the start of the increase of the reference signal VRAMP at time t16 is input to the column memory 54 from the counter 56. The S-memory 54S stores the count value indicated by the count signal CNT at the timing when the signal COMP_OUT is inverted as a digital value obtained by AD conversion of the pixel signal of the S-level.

During the period after time t17, the digital data stored in the column memory 54 is transferred to the signal processing unit 70 in column units under the control of the horizontal scanning circuit 60. The signal processing unit 70 calculates a difference between the S-data and the N-data sent from the column memory 54, and calculates an optical signal from which noise components have been removed. When the S-data is based on the high luminance output (J=1), the difference value between the S-data and the N-data is multiplied by four, whereby the signal is restored to a signal of four times corresponding to the gain of the amplifier circuit 44, and then the signal is output.

However, actually, due to a deviation in gain of the amplifier circuit 44, an offset component caused by switching noise of the feedback capacitor, or the like, only by multiplying the data at the time of high-luminance output by four, a step is generated at the boundary with the low-luminance output, so that good linearity cannot be obtained. Therefore, in the present embodiment, the correction value acquired as follows is used to reduce the level difference of the luminance at the boundary portion between the pixels 12 of the high luminance output and the pixels 12 of the low luminance output.

Next, a method of correcting a pixel value in the imaging device according to the present embodiment will be described with reference to FIG. 5A and FIG. 5B.

Acquisition of a correction value for correcting a pixel value is performed using a blanking period in which a readout operation is not performed in an image frame. First, the vertical scanning circuit 20 controls the control signal ϕSEL to the L level to turn off the select transistor M4, thereby disconnecting the pixel 12 from the output line 16. Next, the voltage supply circuit 34 of the output line control unit 30 generates a voltage (amplitude with respect to the voltage Vn: $\Delta$Vvla) lower than the voltage Vn of the output line 16 according to the pixel signal reference voltage by the voltage $\Delta$Vvla, and inputs the voltage to the output line 16. In this state, the digital value D1 when the gain of the amplifier circuit 44 is one time and the digital value D3 when the gain of the amplifier circuit 44 is four times are acquired in the same manner as the pixel signal readout method described above. The voltage supply circuit 34 of the output line control unit 30 generates a voltage (amplitude with respect to the voltage Vn: $\Delta$Vvlb) lower than the voltage Vn by a voltage $\Delta$Vvlb (<$\Delta$Vvla), and inputs the voltage to the output line 16. In this state, the digital value D2 when the gain of the amplifier circuit 44 is one time and the digital value D4 when the gain of the amplifier circuit 44 is four times are acquired in the same manner as the pixel signal readout method described above. FIG. 5A illustrates the relationship between the voltage of the output line 16 and the digital values D1, D2, D3, and D4.

The digital values D1, D2, D3, and D4 thus acquired are transferred to the signal processing unit 70 in the same manner as the S-data and the N-data, and are used for calculating the correction values in the signal processing unit 70. Specifically, the digital values D1, D2, D3, and D4 are used to calculate the correction values $\alpha$ and $\beta$ from the following equations (1) and (2).

$$4\alpha = (D4-D3)/(D2-D1) \quad (1)$$

$$\beta = D3 - 4\alpha \times D1 \quad (2)$$

When the pixel signal of the S-level is a high luminance output (J=1), the digital value $D_H$ of the pixel signal after the CDS processing can be calculated using the following equation (3) using the correction values $\alpha$ and $\beta$.

$$D_H = 4\alpha(S-N) + \beta \quad (3)$$

The equations (1) to (3) may be rewritten as the following equations (1)' to (3)', where G1 is a gain when the digital values D1 and D3 are acquired, and G2 is a gain when the digital values D2 and D4 are acquired.

$$(G2/G1) \times \alpha = (D4-D3)/(D2-D1) \quad (1)'$$

$$\beta = D3 - (G2/G1) \times \alpha \times D1 \quad (2)'$$

$$D_H = (G2/G1) \times \alpha(S-N) + \beta \quad (3)'$$

On the other hand, when the pixel signal of the S-level is a low luminance output (J=0), the digital value $D_L$ of the pixel signal after the CDS processing may be calculated using the following equation (4) without using the correction values $\alpha$ and $\beta$.

$$D_L = S - N \quad (4)$$

In the equations (3) and (4), S is a digital value read out from the S-memory 54S, and N is a digital value read out from the N-memory 54N.

By performing such correction processing, it is possible to suppress a luminance step occurring at the boundary between the pixels 12 of the high luminance output and the pixels 12 of the low luminance output, and to acquire a high-quality image.

Although it is ideal that the digital output value changes linearly with respect to the incident light amount, the digital output value also has nonlinearity with respect to the incident light amount mainly due to the fact that the amplifier circuit 44 has a degree of nonlinearity in the output characteristic. Therefore, when the relationship between the voltage of the output line 16 and the digital output value is shown in a graph, for example, as indicated by a solid line in FIG. 5B, the voltage of the output line 16 and the digital output value do not have a linear relationship as indicated by a dotted line. Therefore, if the values of the voltage $\Delta$Vvla and the voltage $\Delta$Vvlb are changed when acquiring the correction value, the correction value changes depending on the nonlinearity between the voltage of the output line 16 and the digital output value.

From such a viewpoint, when acquiring the correction value, it is desirable to set the voltages $\Delta$Vvla and $\Delta$Vvlb with the voltage of the output line 16 at the boundary at which the gain is switched as a target point. That is, assuming that the voltage of the output line 16 at the boundary where the gain is switched is (Vn–$\Delta$Vvlj), the voltage $\Delta$Vvla and the voltage $\Delta$Vvlb are set such that $\Delta$Vvla is greater than $\Delta$Vvlj and $\Delta$Vvlb is greater than $\Delta$Vvlj. With this setting, the linearity between the voltage of the output line 16 and the digital output value at the boundary at which the gain of the amplifier circuit 44 is switched can be improved. the voltage of the output line 16 at the boundary where the gain is switched be (Vn–$\Delta$Vvrj).

However, when the pixel signal is actually read, depending on the output response of the amplifier circuit 44, the voltage value of the output line 16 at the boundary at which the low luminance and the high luminance are switched may greatly deviate from the assumed voltage (V–$\Delta$Vvlj). In such a case, the correction error becomes large, and the level difference of the signal level at the boundary between the low luminance region and the high luminance region cannot be reduced. In addition, it may be difficult to adjust the output response level of the amplifier circuit 44 due to environmental temperature, variations in device characteristics occurring during manufacturing, or the like.

Therefore, the output response level of the amplifier circuit 44 is preferably adjusted such that the voltage value of the output line 16 at the boundary between the low luminance and the high luminance approaches (Vn–$\Delta$Vvlj).

FIG. 6 and FIG. 7 are timing charts illustrating the operation from the transfer of the optical signal to the floating diffusion FD to the AD conversion in the column circuit 42. The timing of controlling the control signal φPVLSEL from the L level to the H level is different between FIG. 6 and FIG. 7. As described above, when the fluctuation width (amplitude) of the signal voltage on the output line 16 increases, the determination result in the luminance determination period is switched from the low luminance to the high luminance. In FIG. 6 and FIG. 7, an amplitude value immediately before switching from low luminance to high luminance is assumed. Here, the amplitude value at this time is referred to as a luminance determination boundary level.

First, a driving method according to the reference example illustrated in the timing chart of FIG. 6 will be described.

During the period from the time t10 to the time t11, the vertical scanning circuit 20 controls the control signal φTX of the row to be read out from the L level to the H level. Thereby, the transfer transistor M1 of the pixel 12 in the row is turned on, and the charge accumulated in the photoelectric converter PD is transferred to the floating diffusion FD. The electric charges of the photoelectric converter PD are transferred to the floating diffusion FD, whereby the potential of the floating diffusion FD drops. However, actually, the floating diffusion FD is influenced by feedthrough due to capacitive coupling between the floating diffusion FD and the transfer signal wiring for supplying the control signal φTX, and temporarily rises from the pixel signal reference voltage at the time of reset. Accordingly, the voltage Vvl of the output line 16 also rises from the voltage Vn.

At time t12, the control unit 90 controls the control signal φPVLSEL from the L level to the H level. Thus, the switch SW4 is turned on, and the output line 16 and the amplifier circuit 44 are connected to each other. At this time, the output of the amplifier circuit 44 is a reset voltage at the time of reset, but the output line 16 is at a level higher than the voltage at the time of reset. Therefore, when the output line 16 and the amplifier circuit 44 are connected, the level of the signal Vcamp-out output from the amplifier circuit 44, which is the inverting amplifier circuit, temporarily drops by the voltage ΔVa1. The level of the signal Vcamp-out output from the amplifier circuit 44 rises as the charge is transferred from the pixel 12 to the floating diffusion FD and the potential of the output line 16 drops. However, the amplitude of the signal Vcamp-out increases by an amount corresponding to the temporary drop, and it takes time to settle the signal Vcamp-out.

Time t15 is the end timing of the luminance determination period. When the voltage of the output line 16 is the luminance determination boundary level, the level of the signal Vcamp-out matches the reference voltage VREF of the determination level at this timing.

However, since the signal Vcamp-out drops by the voltage ΔVa1 at the time t12, the settling time is insufficient, and the amplitude required to exceed the reference voltage VREF at the time t15 becomes larger than the assumed amplitude. As a result, the luminance determination boundary level ΔVvlja increases more than the luminance determination boundary level ΔVvlj. In order to lower the readout speed of the imaging device, it is not preferable to shift the time t15 backward to ensure the settling time, as described above.

Time t16 is the start timing of the AD conversion period of the S-level signal. Due to the increase in the luminance determination boundary level ΔVvlja, the timing a at which the signal COMP_OUT is inverted is shifted rearward from the assumed timing. Further, the magnitude of the voltage ΔVa1 changes due to the influence of the feedthrough from the control signal φTX to the floating diffusion FD and the response capability of the amplifier circuit 44 changing depending on the environmental temperature and the device characteristics. If the voltage ΔVa1 increases, the slope of the temporal change of the signal Vcamp-out becomes steep at time t15, and the change (amplitude ΔVa2) of the signal Vcamp-out after time t15 increases. As a result, the timing a is shifted further rearward.

As described above, since the correction values α and β acquire the target point of the signal amplitude in the output line 16 as the ideal luminance determination boundary level ΔVvlj, the correction error increases as the luminance determination boundary level ΔVvlja deviates from the luminance determination boundary level ΔVvlj. In particular, when the luminance determination boundary level ΔVvlja deviates from the luminance determination boundary level ΔVvlj, a correction error appears as a step at the boundary between the low luminance and the high luminance, so that the image quality is remarkably degraded.

As described above, under the driving condition of FIG. 6, the luminance determination boundary level ΔVvlja becomes (ΔVvlja subsequently) (ΔVvlja being equal to or less than ΔVvlj), so that the variation cannot be suppressed, and the deterioration of the image quality of the luminance boundary cannot be avoided.

Next, a driving method according to the present embodiment illustrated in the timing chart of FIG. 7 will be described.

In order to reduce the influence of the drop of the voltage ΔVa1 received by the amplifier circuit 44, the output line 16 and the amplifier circuit 44 may be connected after the signal level of the output line 16 returns to the reset signal level.

Therefore, in the timing chart of FIG. 7, in order to lengthen the period from the time t11 to the time t12, the control signal φPVLSEL is controlled from the L level to the H level at the timing of the time t12' in which the timing of the time t12 is shifted backward.

Specifically, during a period in which the transfer transistor M1 is turned on and a period from when the transfer switch transitions from ON to OFF until when the output unit of the pixel 12 is settled, the switch SW4 is maintained to OFF, and thereafter, the switch SW4 is turned on. The period until the output portion is settled is a period until the influence of feedthrough from the control signal φTX to the floating diffusion FD is relaxed. Alternatively, the period until the output portion is settled may be referred to as a period until the potential of the output line 16 becomes lower than the potential of the output line 16 before the charge is transferred to the floating diffusion FD.

At time t12', the signal level of the output line 16 is sufficiently lowered from the high level state due to the influence of the transfer signal line and is lower than the reset level, so that the signal Vcamp-out does not drop.

Therefore, at time t15, which is the end timing of the luminance determination period, the signal Vcamp-out is settled more than in the case of FIG. 6, and the amplitude ΔVb2 of the signal Vcamp-out after time t15 is smaller than the amplitude ΔVa2. Accordingly, the luminance determination boundary level ΔVvljb is lower than the luminance determination boundary level ΔVvlja and approaches the ideal luminance determination boundary level ΔVvlj. Further, since the change in the signal Vcamp-out does not become steep even at the timing c at which the AD conversion of the S-level signal starts at the time t16, the position of the timing b is not greatly shifted even if the environmental temperature or the device characteristics change.

Therefore, according to this driving example, since the luminance determination boundary level $\Delta Vvljb$ is close to the luminance determination boundary level $\Delta Vvlj$ at the time of acquiring the correction values $\alpha$ and $\beta$, and the variation is small, the correction error is suppressed to be small, and good linearity can be obtained at the luminance boundary.

As described above, according to the present embodiment, in the imaging device that switches the gain of the amplifier circuit for each pixel in accordance with the amount of incident light, a high-quality image may be acquired without decreasing the readout speed.

Second Embodiment

An imaging system according to a second embodiment of the present disclosure will be described with reference to FIG. 8. FIG. 8 is a block diagram illustrating a schematic configuration of an imaging system according to the present embodiment.

The imaging device 100 described in the first embodiment is applicable to various imaging systems. Examples of applicable imaging systems include a digital still camera, a digital camcorder, a surveillance camera, a copier, a fax, a cellular phone, an in-vehicle camera, and an observation satellite. A camera module including an optical system such as a lens and an imaging device is also included in the imaging system. FIG. 8 is a block diagram of a digital still camera.

The imaging system 200 illustrated in FIG. 8 includes an imaging device 201, a lens 202 for forming an optical image of an object on the imaging device 201, an aperture 204 for varying the amount of light passing through the lens 202, and a barrier 206 for protecting the lens 202. The lens 202 and the aperture 204 are optical systems for focusing light on the imaging device 201. The imaging device 201 is the imaging device 100 described in the first embodiment, and converts an optical image formed by the lens 202 into image data.

The imaging system 200 also includes a signal processing unit 208 that processes an output signal output from the imaging device 201. The signal processing unit 208 generates image data from the digital signal output from the imaging device 201. The signal processing unit 208 performs various types of correction and compression as necessary to output image data. The imaging device 201 may include an AD conversion unit that generates a digital signal to be processed by the signal processing unit 208. The AD conversion unit may be formed on a semiconductor layer (semiconductor substrate) on which the photoelectric converter of the imaging device 201 is formed, or may be formed on a semiconductor substrate different from the semiconductor layer on which the photoelectric converter of the imaging device 201 is formed. The signal processing unit 208 may be formed on the same semiconductor substrate as the imaging device 201.

The imaging system 200 further includes a buffer memory unit 210 for temporarily storing image data, and an external interface unit (external I/F unit) 212 for communicating with an external computer or the like. The imaging system 200 further includes a storage medium 214 such as a semiconductor memory for storing or reading out imaging data, and a storage medium control interface unit (storage medium control I/F unit) 216 for storing or reading out imaging data on or from the storage medium 214. The storage medium 214 may be built in the imaging system 200 or may be detachable.

The imaging system 200 further includes a general control/operation unit 218 that performs various calculations and controls the entire digital still camera, and a timing generation unit 220 that outputs various timing signals to the imaging device 201 and the signal processing unit 208. Here, the timing signal or the like may be input from the outside, and the imaging system 200 may include at least the imaging device 201 and the signal processing unit 208 that processes the output signal output from the imaging device 201.

The imaging device 201 outputs an imaging signal to the signal processing unit 208. The signal processing unit 208 performs predetermined signal processing on an imaging signal output from the imaging device 201, and outputs image data. The signal processing unit 208 generates an image using the imaging signal.

As described above, according to the present embodiment, the imaging system to which the imaging device 100 according to the first embodiment is applied may be realized.

Third Embodiment

Figure 9A:
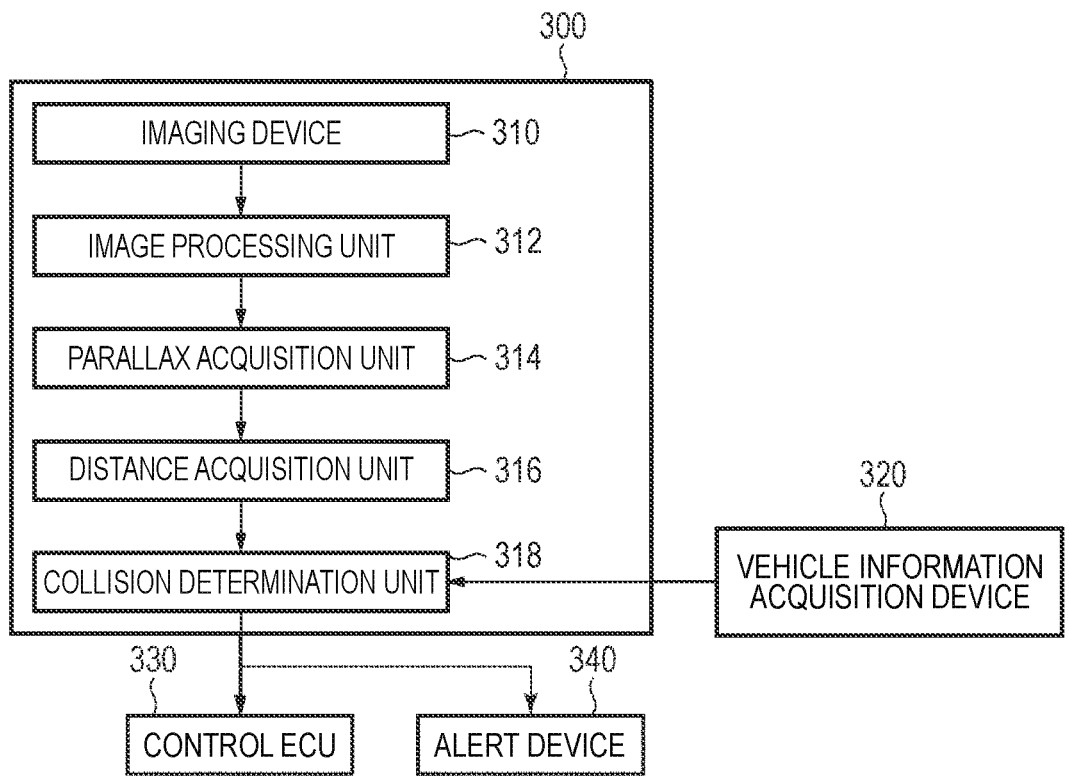
FIG. 9A is a diagram illustrating a configuration example of an imaging system according to a third embodiment of the present disclosure.
Figure 9B:
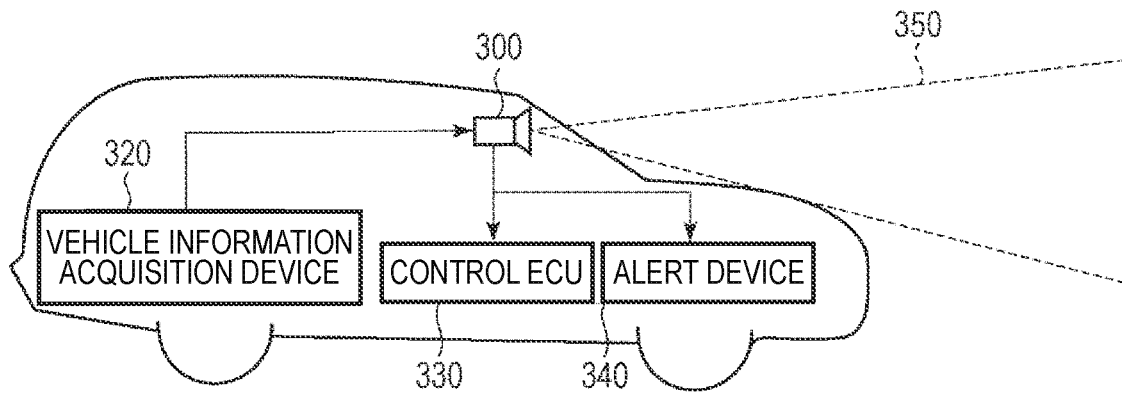
FIG. 9B is a diagram illustrating a configuration example of a movable object according to the third embodiment of the present disclosure.

An imaging system and a movable object according to a third embodiment of the present disclosure will be described with reference to FIG. 9A and FIG. 9B. FIG. 9A is a diagram illustrating a configuration of an imaging system according to the present embodiment. FIG. 9B is a diagram illustrating a configuration of a movable object according to the present embodiment.

FIG. 9A illustrates an example of an imaging system related to an in-vehicle camera. The imaging system 300 includes an imaging device 310. The imaging device 310 is the imaging device 100 described in the first embodiment. The imaging system 300 includes an image processing unit 312 that performs image processing on a plurality of image data acquired by the imaging device 310, and a parallax acquisition unit 314 that calculates parallax (phase difference of parallax images) from the plurality of image data acquired by the imaging device 310. The imaging system 300 also includes a distance acquisition unit 316 that calculates the distance to the object based on the calculated parallax, and a collision determination unit 318 that determines whether there is a possibility of collision based on the calculated distance. Here, the parallax acquisition unit 314 and the distance acquisition unit 316 are an example of a distance information acquisition unit that acquires distance information to the object. That is, the distance information is information related to parallax, defocus amount, distance to the object, and the like. The collision determination unit 318 may determine the possibility of collision using any of the distance information. The distance information acquisition unit may be realized by hardware designed exclusively, or may be realized by a software module. It may be realized by FPGA (Field Programmable Gate Array), ASIC (Application Specific Integrated circuit), or the like, or may be realized by a combination of these.

The imaging system 300 is connected to the vehicle information acquisition device 320, and may acquire vehicle information such as a vehicle speed, a yaw rate, and a steering angle, and the like. Further, the imaging system 300 is connected to a control ECU 330, which is a control device that outputs a control signal for generating braking force to the vehicle based on the determination result obtained by the collision determination unit 318. The imaging system 300 is also connected to an alert device 340 that issues an alarm to the driver based on the determination result obtained by the collision determination unit 318. For example, when the collision possibility is high as the determination result of the collision determination unit 318, the control ECU 330 performs vehicle control to avoid collision and reduce damage by applying a brake, returning an accelerator, suppressing engine output, or the like. The alert device 340 sounds an alarm such as a sound, displays alarm information on a screen of a car navigation system or the like, and provides a warming to the user by applying vibration to a seatbelt or steering.

In the present embodiment, an image of the periphery of the vehicle, for example, the front or the rear is captured by the imaging system 300. FIG. 9B illustrates an imaging system in the case of capturing an image of the front of the vehicle (imaging range 350). The vehicle information acquisition device 320 sends an instruction to the imaging system 300 or the imaging device 310. With such a configuration, the accuracy of distance measurement may be further improved.

Although an example in which the vehicle is controlled so as not to collide with another vehicle has been described above, the present invention is also applicable to a control in which the vehicle is automatically driven following another vehicle, a control in which the vehicle is automatically driven so as not to protrude from a lane, and the like. Further, the imaging system may be applied not only to a vehicle such as a host vehicle, but also to a movable object (movable device) such as a ship, an aircraft, or an industrial robot. In addition, the present invention may be applied not only to a movable object but also to an apparatus using object recognition in a wide range such as an advanced road traffic system (ITS).

Modified Embodiments

The present disclosure is not limited to the above embodiments, and various modifications are possible.

For example, an example in which a configuration of a part of any embodiment is added to another embodiment or an example in which a configuration of a part of another embodiment is substituted is also an embodiment of the present disclosure.

The circuit configuration of the pixel 12 illustrated in FIG. 2 is an example, and may be changed as appropriate. For example, a pixel configuration in which a charge holding portion is further provided separately from the floating diffusion FD and a global electronic shutter operation may be performed may be employed.

In the first embodiment, the gain of the amplifier circuit 44 for amplifying the pixel signal is one or four times. Further, the gain of the amplifier circuit 44 is not necessarily two types, and for example, three or more types of pixel signals, such as low luminance, medium luminance, and high luminance, may be determined and amplified by gains corresponding to them.

Further, in the first embodiment, the correction processing is performed on the digital values transferred from the column memory 54 to the signal processing unit 70 using the correction values α and β, thereby effectively suppressing the level difference in luminance occurring at the boundary between the pixels 12 of the high luminance output and the pixels 12 of the low luminance output. However, even when the operation timing of the transfer transistor M1 and the switch SW4 is set as described above, the effect of reducing the level difference of the luminance occurring at the boundary between the pixel 12 of the high luminance output and the pixel 12 of the low luminance output must be small. Therefore, the correction processing using the correction values α and β is not necessarily performed.

The function of the signal processing unit 70 is not necessarily provided in the imaging device 100, and may be implemented outside the imaging device 100. For example, in the imaging system 200 of the second embodiment, at least a part of the functions of the signal processing unit 70 may be provided in the signal processing unit 208. The amplifier circuit 44 may include a luminance determination circuit. In any of the embodiments, the same effects as those described in the above embodiments can be achieved.

In the first embodiment, an apparatus intended to acquire an image, i.e., an imaging device is exemplified, but the application example of the present disclosure is not necessarily limited to the imaging device. For example, in the case where the present invention is applied to an apparatus mainly targeted for distance measurement as described in the third embodiment, it is not always necessary to output an image. In such a case, the device can be said to be a photoelectric conversion device that converts optical information into a predetermined electric signal. The imaging device is one of photoelectric conversion devices.

The imaging system described in the second or third embodiment is an example of an imaging system to which the photoelectric conversion device of the present disclosure may be applied, and the imaging system to which the photoelectric conversion device of the present disclosure may be applied is not limited to the configurations illustrated in FIG. 8 and FIG. 9A.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-178130, filed Oct. 23, 2020 which is hereby incorporated by reference herein in its entirety.

What is claimed is:

1. An imaging device comprising:
a pixel including a photoelectric converter, a charge holding portion, a first switch configured to transfer charge in the photoelectric converter to the charge holding portion, and an output unit configured to output a pixel signal based on an amount of charge held in the charge holding portion;
an output line that the pixel signal is to be output from the pixel;
a readout circuit unit connected to the output line; and
a control unit configured to control the pixel and the readout circuit unit,
wherein the readout circuit unit includes an amplifier circuit, a second switch provided between the output line and the amplifier circuit, and a comparator configured to compare the pixel signal amplified by the amplifier circuit with a reference signal,
wherein the control unit is configured to perform
a first period of outputting a pixel signal based on an amount of charge to the output line by turning on the first switch to transfer the charge in the photoelectric converter to the charge holding portion,
a second period of determining by the comparator a level of the pixel signal output to the output line in the first period and amplified by the amplifier circuit, and
a third period of setting a gain of the amplifier circuit in accordance with a result of determination by the comparator, and
wherein the control unit is further configured to set the second switch to an off state during a period in which the first switch is in an on state and a period until the output unit is settled after the first switch transitions from the on state to an off state.

2. The imaging device according to claim 1, wherein the period until the output unit is settled is a period until a potential of the output line becomes lower than a potential of the output line before the charge is transferred to the charge holding portion.

3. The imaging device according to claim 1, wherein the control unit is configured to set a gain of the amplifier circuit to a second gain smaller than a first gain when a level of the pixel signal amplified by the first gain is higher than a level of the reference signal.

4. The imaging device according to claim 3, wherein the readout circuit unit further includes an analog-to-digital conversion circuit including the comparator and configured to perform an analog-to-digital conversion on the pixel signal amplified by the amplifier circuit, and is configured to output a first digital pixel signal based on a reference voltage output from the pixel in a reset state and a second digital pixel signal based on the pixel signal amplified by a gain set in the third period.

5. The imaging device according to claim 4 further comprising a voltage supply circuit configured to supply a constant voltage to the output line,
wherein the control unit is configured to control the readout circuit unit to acquire
a first digital value when amplified by the second gain and a third digital value when amplified by the first gain with supplying to the output line a first voltage having a first amplitude with respect to the reference voltage, and
a second digital value when amplified by the second gain and a fourth digital value when amplified by the first gain with supplying to the output line a second voltage having a second amplitude smaller than the first amplitude with respect to the reference voltage.

6. The imaging device according to claim 5, wherein the first digital value, the second digital value, the third digital value, and the fourth digital value are acquired during a blanking period.

7. The imaging device according to claim 5 further comprising a signal processing unit configured to process a signal output from the readout circuit unit,
wherein the signal processing unit is configured to perform a correction processing on the first digital pixel signal and the second digital pixel signal based on a correction value calculated from the first digital value, the second digital value, the third digital value, and the fourth digital value.

8. The imaging device according to claim 7, wherein the following relationships are satisfied, where G1 is the first gain, G2 is the second gain, D1 is the first digital value, D2 is the second digital value, D3 is the third digital value, D4 is the fourth digital value, and $\alpha$ and $\beta$ are the correction values:

$$(G2/G1) \times \alpha = (D4-D3)/(D2-D1), \text{ and}$$

$$\beta = D3 - (G2/G1) \times \alpha D1.$$

9. The imaging device according to claim 7, wherein, when the second digital pixel signal is based on a pixel signal amplified by the second gain, a digital value $D_H$ of the digital pixel signal after the correction process is expressed by the following equation, where N is a digital value of the first digital pixel signal, and S is a digital value of the second digital pixel signal:

$$D_H = (G2/G1) \times \alpha(S-N)\beta.$$

10. The imaging device according to claim 8, wherein, when the second digital pixel signal is based on a pixel signal amplified by the first gain, a digital value $D_L$ of a digital pixel signal after the correction process is expressed by the following equation, where N is a digital value of the first digital pixel signal, and S is a digital value of the second digital pixel signal:

$$D_L = S - N.$$

11. The imaging device according to claim 5, wherein a voltage of the output line corresponding to a level of the reference signal is a voltage between the first voltage and the second voltage.

12. The imaging device according to claim 1 comprising a plurality of pixels arranged in a plurality of rows and a plurality of columns,
wherein the output line is provided corresponding to each of the plurality of columns,
wherein the readout circuit unit includes a plurality of column circuits provided corresponding to the plurality of columns, and each including the amplifier circuit, the second switch, and the comparator, and
wherein the control unit is configured to set a gain of the amplifier circuit for the pixel signal of each of the plurality of pixels.

13. A method of driving an imaging device including a pixel including a photoelectric converter, a charge holding portion, a first switch configured to transfer charge in the photoelectric converter to the charge holding portion, and an output unit configured to output a pixel signal based on an amount of charge held in the charge holding portion, an output line that the pixel signal is to be output from the pixel, and a readout circuit unit connected to the output line, wherein the readout circuit unit includes an amplifier circuit, a second switch provided between the output line and the amplifier circuit, and a comparator configured to compare the pixel signal amplified by the amplifier circuit with a reference signal, the method comprising:

performing a first period of outputting a pixel signal based on an amount of charge to the output line by turning on the first switch to transfer charge in the photoelectric converter to the charge holding portion, performing a second period of determining by the comparator a level of the pixel signal output to the output line in the first period and amplified by the amplifier circuit, and performing a third period of setting a gain of the amplifier circuit according to a result of determination by the comparator, wherein the second switch is set to an off state during a period in which the first switch is in an on state and a period until the output unit is settled after the first switch transitions from the on state to an off state.

14. An imaging system comprising:

the imaging device according to claim 1; and a signal processing device configured to process a signal output from the imaging device.

15. A movable object comprising:

the imaging device according to claim 1;

a distance information acquiring unit configured to acquire a distance information to an object from a parallax image based on a signal output from the pixel of the imaging device; and a control unit configured to control the movable object based on the distance information.

* * * * *